United States Patent
Yoon et al.

(10) Patent No.: US 10,506,372 B2
(45) Date of Patent: Dec. 10, 2019

(54) INDOOR/OUTDOOR COVERAGE DETECTION BASED ON SENSOR INPUTS

(71) Applicant: T-Mobile USA, Inc., Bellevue, WA (US)

(72) Inventors: Jong Sung Yoon, Bellevue, WA (US); Jie Hui, Mercer Island, WA (US); Michael Mitchell, North Bend, WA (US); Zhuoqing Morley Mao, Ann Arbor, MI (US); Yunhan Jia, Ann Arbor, MI (US); Chao Kong, Ann Arbor, MI (US)

(73) Assignees: T-Mobile USA, Inc., Bellevue, WA (US); The Regents of the University of Michigan, Ann Arbor, MI (US)

( * ) Notice: Subject to any disclaimer, the term of this patent is extended or adjusted under 35 U.S.C. 154(b) by 99 days.

(21) Appl. No.: 15/584,261

(22) Filed: May 2, 2017

(65) Prior Publication Data

US 2017/0366943 A1  Dec. 21, 2017

Related U.S. Application Data

(60) Provisional application No. 62/351,614, filed on Jun. 17, 2016.

(51) Int. Cl.
*H04W 4/02* (2018.01)
*H04W 4/04* (2009.01)
*H04W 64/00* (2009.01)
*H04M 1/725* (2006.01)
*H04W 4/33* (2018.01)

(52) U.S. Cl.
CPC ....... *H04W 4/023* (2013.01); *H04M 1/72566* (2013.01); *H04M 1/72569* (2013.01); *H04M 1/72572* (2013.01); *H04W 4/025* (2013.01); *H04W 4/043* (2013.01); *H04W 64/006* (2013.01); *H04M 2250/52* (2013.01); *H04W 4/33* (2018.02)

(58) Field of Classification Search
CPC .......... A61B 2560/0242; A61B 5/1118; A61B 2560/0209; A61B 5/02427; H04W 4/02; H04W 4/043; H04W 4/027; H04W 24/02; H04W 84/00; H04W 88/02; H04W 88/08; H04W 4/33; H04W 52/0251; H04W 52/0254; G01J 1/4204; G01S 5/0278; G01S 11/06; G01S 13/08; G01S 5/0257
See application file for complete search history.

(56) References Cited

U.S. PATENT DOCUMENTS

| 2012/0252495 | A1 | 10/2012 | Moeglein et al. | |
|---|---|---|---|---|
| 2014/0179298 | A1* | 6/2014 | Grokop | G01S 19/48 455/418 |
| 2015/0073741 | A1 | 3/2015 | Wüest et al. | |

(Continued)

OTHER PUBLICATIONS

International Search Report and Written Opinion dated Oct. 19, 2017 for PCT Application No. PCT/US2017/035079, 11 pages.

*Primary Examiner* — Kwasi Karikari
(74) *Attorney, Agent, or Firm* — Han Santos, PLLC

(57) ABSTRACT

Techniques are disclosed for determining whether a mobile device is located indoors or outdoors. In some embodiments, a mobile device may utilize a fusion of the information from multiple sensors, such as a RGB sensor, a proximity sensor, a light intensity sensor, and a WiFi radio, to determine whether the mobile device is located indoors or outdoors.

20 Claims, 9 Drawing Sheets

(56) References Cited

U.S. PATENT DOCUMENTS

2015/0097731 A1    4/2015  Russell
2016/0014554 A1    1/2016  Sen et al.
2017/0078854 A1*   3/2017  Swaminathan ....... H04W 4/043

\* cited by examiner

INDOOR/OUTDOOR COVERAGE DETECTION BASED ON SENSOR INPUTS

CROSS-REFERENCE TO RELATED APPLICATIONS

This application claims priority to provisional application, 62/351,614, filed on Jun. 17, 2016, and titled "Indoor/Outdoor Coverage Detection Based on Sensor Fusion and Audio Echo," the contents of which are incorporated herein by reference.

BACKGROUND

Mobile devices, such as cellular telephones may experience different behavior based on whether they are located indoors or outdoors. For example, it may be that a single cellular telephone experiences significantly better reception when located outdoors, in the front yard of a house, as opposed to indoors, just inside the house, even though these two physical locations are nearly identical. It may be common that a mobile device experiences worse reception when indoors than in otherwise identical conditions, but outdoors.

BRIEF DESCRIPTION OF THE DRAWINGS

The Detailed Description is set forth with reference to the accompanying Figures.

DETAILED DESCRIPTION

Overview

A mobile device may use sensors to determine whether it is located indoors or outdoors. A combination of sensor fusion (e.g., a mobile device's proximity sensor, camera sensor, light intensity sensor, and WiFi radio) and audio echo may be utilized to make this determination of whether the mobile device is located indoors or outdoors.

During daytime, a mobile device's proximity sensor and camera sensor may be used to make this determination. If the mobile device's camera sensor is unavailable or available but cannot be used (e.g., the device is located in a pocket), then audio echo is utilized. If audio echo cannot be utilized, a combination of light intensity and WiFi signal strength may be utilized.

At night, first a combination of light intensity and WiFi signal strength may be utilized. If there is no measurable light, or the mobile device is not connected to a WiFi network, then the other of those two approaches is used. If there is neither measurable light nor a connected WiFi network, then an audio echo approach is utilized.

In some embodiments, determining whether a mobile device is located indoors or outdoors may comprise determining whether a time of day for the mobile device corresponds to day time or night time. In response to determining that the time of day for the mobile device corresponds to day time, the mobile device may determine whether the mobile device has an image sensor that is accessible, and determine whether the mobile device has a proximity sensor that is accessible. In response to determining that the mobile device has the image sensor that is accessible and the proximity sensor that is accessible, the mobile device may determine whether the proximity sensor indicates that the distance between the mobile device and an object observable by the proximity sensor is above a predetermined threshold distance. And in response to determining that the proximity sensor indicates that the distance between the mobile device and the object observable by the proximity sensor is above the predetermined threshold distance, the mobile device may determine whether the mobile device is located indoors or outdoors based on the image sensor of the mobile device.

Exemplary Hardware, Software and Communications Environment

Figure 1:
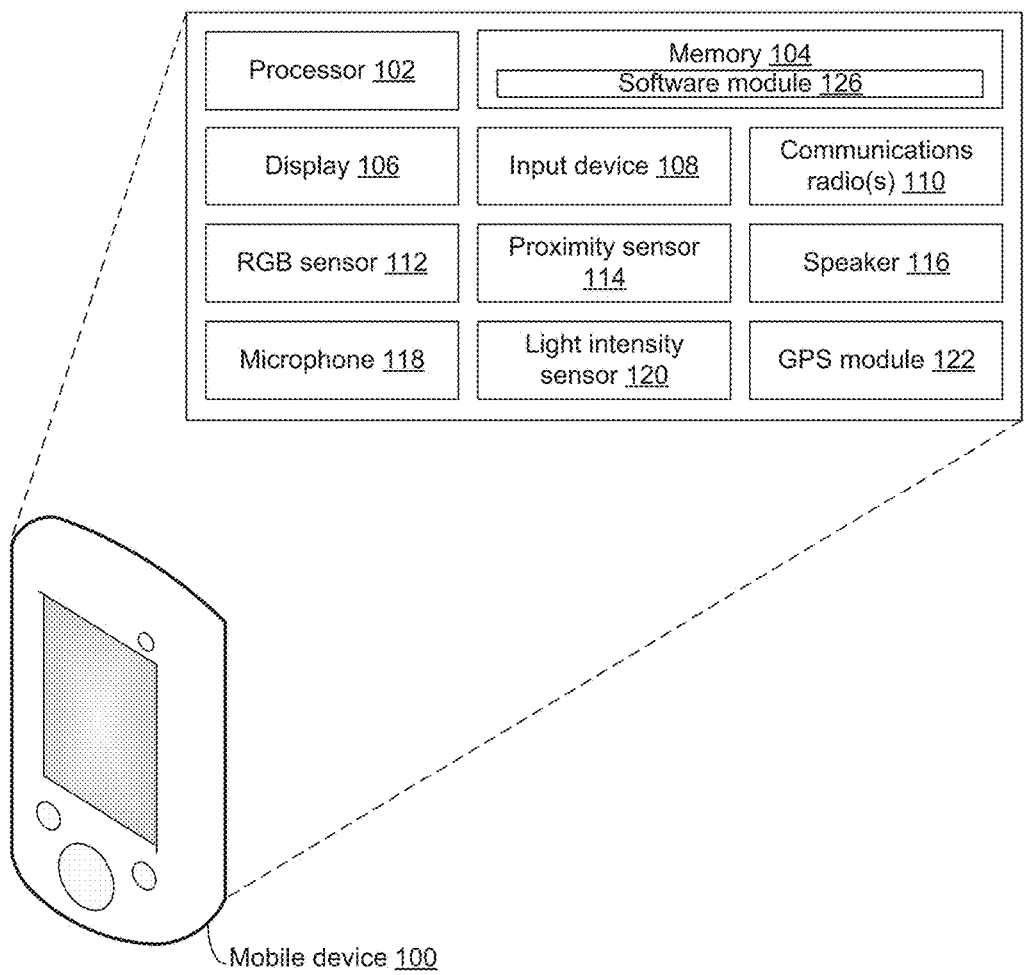
FIG. 1 is a block diagram of a system architecture in which embodiments may be implemented.

FIG. 1 is a top-level diagram of a system architecture in which embodiments may be implemented. As depicted, FIG. 1 contains mobile device 100. Mobile device 100 may be generally considered to be a computing device, such as a smartphone, a tablet computer, a feature phone, and/or so forth. In other embodiments, aspects of the disclosure may be implemented on other types of computing equipment.

Mobile device 100 contains several components, such as processor 102, memory 104, display 106, input device 108, communications radio(s) 110, RGB sensor 112, proximity sensor 114, speaker 116, microphone 118, light intensity sensor 120, and GPS module 122.

Processor 102 is a microprocessor, such as a central processing unit (CPU) that is configured to execute computer-executable instructions. The memory 104 may be implemented using computer-readable media, such as computer storage media. Computer-readable media includes, at least, two types of computer-readable media, namely computer storage media and communications media. Computer storage media includes non-transitory volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory and/or storage technology, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

Display 106 is a display, such as a liquid crystal display (LCD), that is configured to display visual output by mobile device 100. Input device 108 is computer hardware configured to receive and process user input, such as touch input, or physical buttons that a user may press. Where input device 108 is configured to receive tough input, input device 108 and display 106 may together form a touchscreen.

Communications radio(s) 110 is one or more radios configured to send and/or receive wireless communications. Communications radio(s) 110 may be configured to send and receive cellular network communications, such as via a Long-Term Evolution (LTE) protocol, or a LTE in unlicensed spectrum (LTE-u) protocol. Communications radio(s) 110 may also be configured to send wireless local area network communications, such as via a WiFi protocol, or another 802.11 protocol.

RGB (Red-Green-Blue) sensor 112 may be an image sensor that is configured to capture and store images of the physical world. In some embodiments, RGB sensor 112 may be a camera. In some embodiments where RGB sensor is a camera, it may be that the camera is used to capture information about light intensity, red color temperature, green color temperature, and blue color temperature, rather than (or in addition to) an image. While mobile device 100 is depicted as comprising RGB sensor 112, it may be appreciated that there are other embodiments that utilize other types of image sensors, such as a RGBW (RGB-white) sensor, or a YUV (luma, U chrominance, and V chrominance) sensor.

Proximity sensor 114 is a sensor that is configured to determine whether there is an external object within a certain distance of proximity sensor 114. For example, proximity sensor 114 may be located on the side of mobile device 100 that a user holds to his or her ear when he or she makes a phone call. Proximity sensor 114 may detect that the user's ear is close to mobile device 100, and in response, temporarily turn off display 106 to conserve battery (since it is difficult for a user to look at display 106 if mobile device 100 is next to his or her ear).

Figure 6:
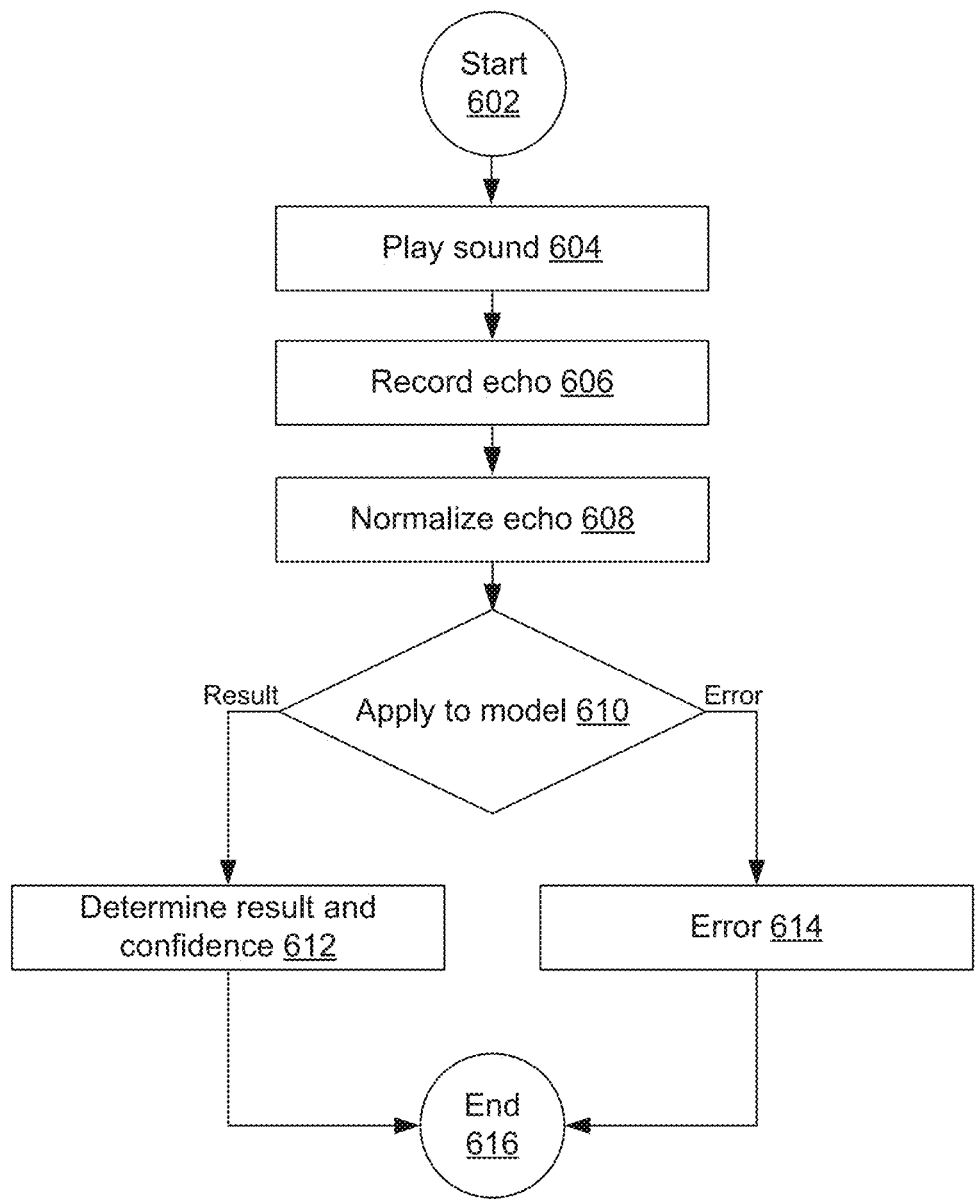
FIG. 6 depicts example operating procedures for a mobile device using audio echo to determine whether it is located indoors or outdoors.

Speaker 116 is hardware that is configured to emit audio, such as used with an audio echo approach to determining whether mobile device 100 is located indoors or outdoors, as described with respect to the operating procedures of FIG. 6. Microphone 118 is hardware that is configured to receive audio, such as used with an audio echo approach to determining whether mobile device 100 is located indoors or outdoors, as described with respect to the operating procedures of FIG. 6.

Light intensity sensor 122 is hardware that is configured to identify an intensity of light external to mobile device 100. For example, light intensity sensor 122 may be configured to capture external light intensity, and mobile device 100 uses that information to adjust a brightness of display 106. In some embodiments, light intensity sensor may be a camera image sensor. GPS (Global Positioning System) module 124 is hardware that is configured to determine a physical location of mobile device 100 according to a GPS protocol.

These components may be used to implement aspects of the disclosure, such as to implement the operating procedures of FIGS. 3-9. For example, computer-executable instructions corresponding to the operating procedures of at least one of FIGS. 3-9 may be stored in memory 104 as software modules 126 and executed by processor 102. A software module is a set of computer executable instructions stored together as a discrete whole. Examples of software modules include binary executables such as static libraries, dynamically linked libraries, and executable programs. Other examples of software modules include interpreted executables that are executed on a run time such as servlets, applets, p-Code binaries, and Java binaries. Software modules include computer-executable instructions that may run in kernel mode and/or user mode.

Figure 2:
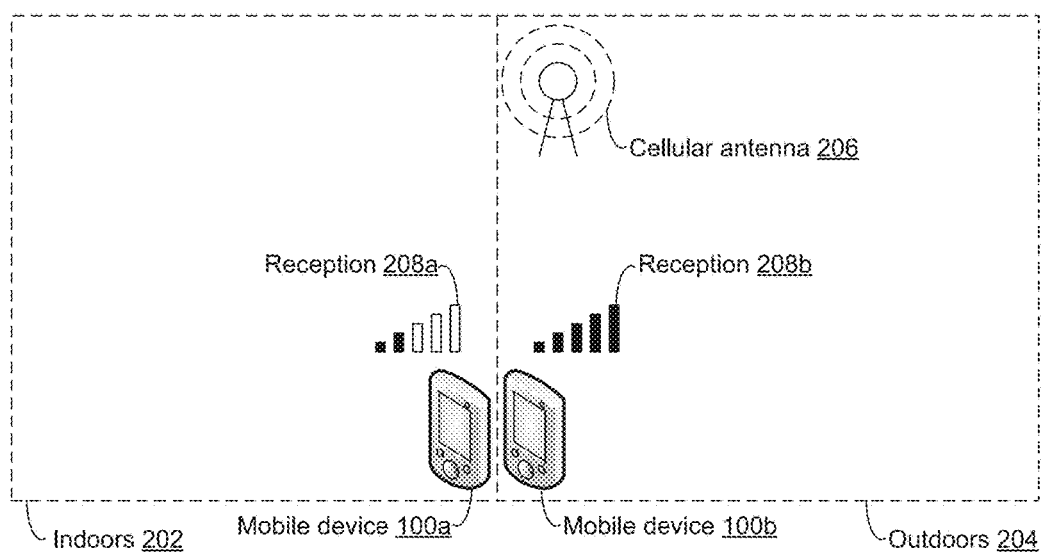
FIG. 2 is a diagram of two mobile devices that experience a different reception strength based on where they are physically located.

FIG. 2 is a diagram of two mobile devices that experience a different reception strength based on where they are physically located. As depicted, there are two mobile devices—mobile device 100a and mobile device 100b. Mobile device 100a is located indoors 202, and mobile device 100b is located outdoors 204. Both mobile device 100a and mobile device 100b are in wireless communication with cellular antenna 206. And even though mobile device 100a and mobile device 100b are in nearly the same physical location and nearly the same distance from cellular antenna 206, mobile device 100a and mobile device 100b experience markedly different levels of reception quality from cellular antenna 206.

Mobile device 100a has reception 208a of two bars out of a possible five bars. And mobile device 100b has much stronger reception—reception 208b of five bars out of a possible five bars. While mobile device 100a and mobile device 100b are located in close physical proximity, they experience these different levels of reception because mobile device 100a is located indoors while mobile device 100b is located outdoors, and a mobile device will generally experience worse reception indoors relative to outdoors, all other things being equal. This worse reception indoors may be due to a variety of factors, including wireless signals having to pass through walls or ceilings, which may degrade the signals' quality.

Such a difference in signal quality between a mobile device located indoors and a mobile device located outdoors may even extend to a situation where one mobile device is located in a building, and another mobile device located directly above the first mobile device, on the roof of the building. In such a situation, the two mobile devices may have the same GPS coordinates, so more than GPS information may be used to determine whether a mobile device is located indoors or outdoors.

Determining Whether a Mobile Device is Located Indoors or Outdoors

Figure 3:
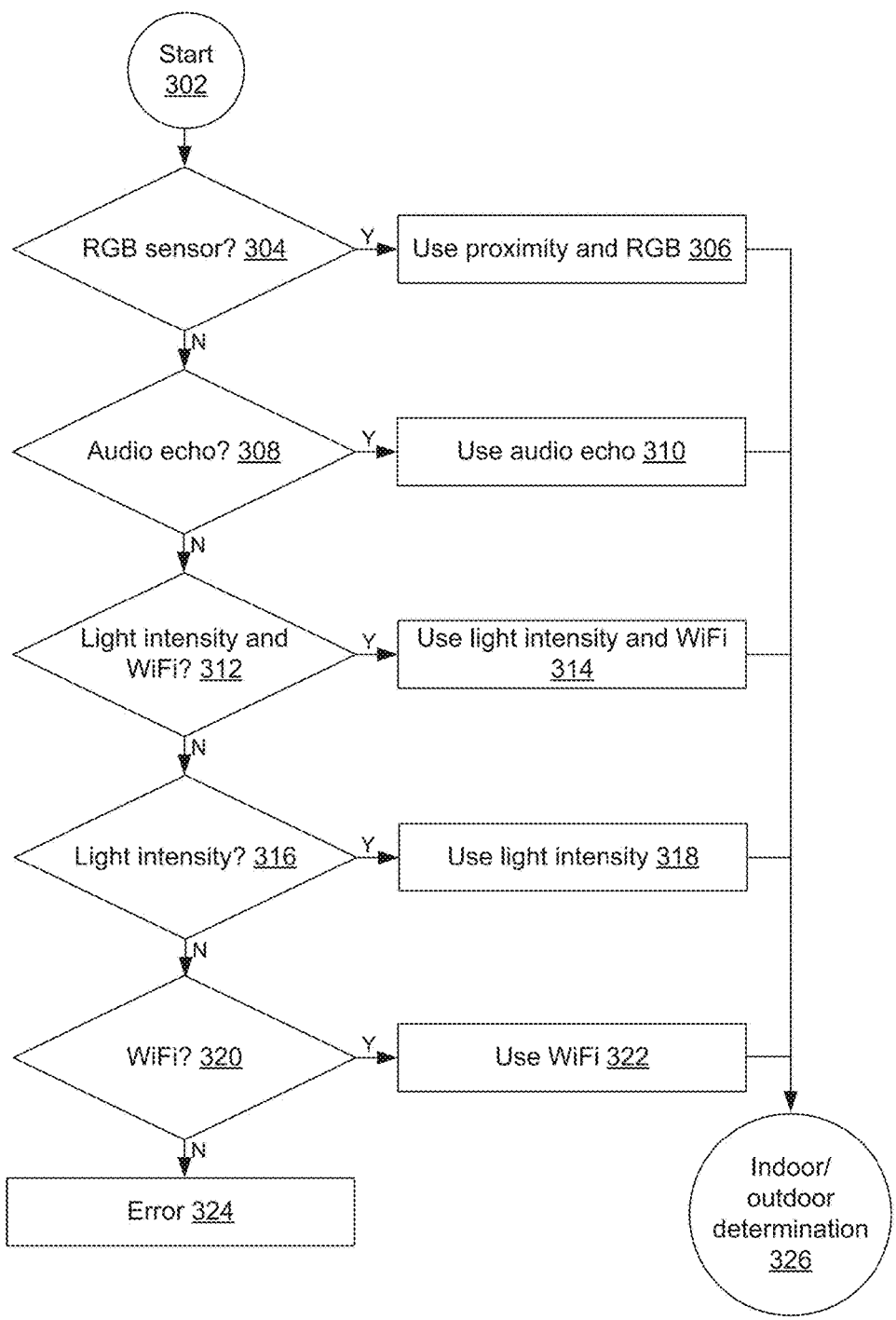
FIG. 3 depicts example operating procedures for a mobile device determining whether it is located indoors or outdoors.

FIG. 3 depicts example operating procedures for a mobile device determining whether it is located indoors or outdoors. In some embodiments, the operating procedures of FIG. 3 (and FIGS. 4-9) may be implemented by mobile device 100a (such as through computer-executable instructions that are stored in memory 104 and executed by processor 102). It may be appreciated that the operating procedures of FIG. 3 are example operating procedures, and that there may be embodiments that implement more or fewer operations than are depicted, or that implement the operations in a different order than is depicted here.

In some embodiments, data (such as RGB sensor data, audio echo data, light intensity data, and WiFi data) may be gathered on one mobile device, and then one or more other computing devices may process that data to determine whether the first mobile device is located indoors or outdoors (or was located indoors or outdoors when it gathered the data). A similar relationship between multiple devices may exist with respect to the operating procedures of FIGS. 4-9.

The operating procedures of FIG. 3 start with operation 302 and then move to operation 304. Operation 304 depicts determining whether the mobile device has an accessible RGB image sensor. In some embodiments, operation 304 may comprise making an application programming interface (API) call to system software of the mobile device, where the system software responds with an indication of whether the device has an accessible RGB image sensor. In other embodiments, mobile device may store in its memory an indication of whether it has an accessible RGB image sensor in a known location.

A RGB image sensor may be considered to be accessible where it may be utilized by the operating procedures of FIG. 3 to determine light intensity, red color temperature, green color temperature, and blue color temperature (or a subset of these metrics, or similar metrics), rather than (or in addition to) an image. In some embodiments, an image sensor that captures an image while preventing direct access to this information may use this information in capturing the image, but this information may be lost once the image is captured.

If in operation 304 it is determined that the mobile device does have an accessible RGB image sensor, then the operating procedures of FIG. 3 move to operation 306. Instead, if in operation 304 it is determined that the mobile device does not have an accessible RGB image sensor, then the operating procedures of FIG. 3 move to operation 308. In some embodiments, it may be determined that there is not an accessible RGB image sensor when it is night time (so it would be unlikely that there is enough ambient light with which to use a RGB image sensor).

Operation 306 is reached from operation 304 where it is determined in operation 304 that the mobile device does have an accessible RGB image sensor. Operation 306 depicts using the proximity sensor and RGB sensor of the mobile device to determine whether the mobile device is located indoors or outdoors. In some embodiments, operation 306 comprises first using the proximity sensor to determine when the mobile device is uncovered, by implementing the operating procedures of FIG. 4.

Then, since the RGB image sensor is uncovered, the mobile device uses the RGB image sensor to gather light intensity, red color temperature, green color temperature, and blue color temperature information from the outside world. The mobile device then uses these metrics to determine whether the mobile device is located indoors or outdoors. After operation 306, the operating procedures of FIG. 3 move to operation 326.

Operation 308 is reached from operation 304 where it is determined in operation 304 that the mobile device does not have an accessible RGB image sensor. Operation 308 depicts determining whether the mobile device can use audio echo to determine whether the mobile device is located indoors or outdoors. In some embodiments, the mobile device may not be able to use audio echo to determine whether it is located indoors or outdoors because it lacks a speaker or a microphone, or because it has a speaker and a microphone but does not receive a sufficient echo signal after emitting a sound to make a determination about whether it is located indoors or outdoors.

If in operation 308 it is determined that the mobile device can use audio echo to determine whether the mobile device is located indoors or outdoors, then the operating procedures of FIG. 3 move to operation 310. Instead, if in operation 304 it is determined that the mobile device cannot use audio echo to determine whether the mobile device is located indoors or outdoors, then the operating procedures of FIG. 3 move to operation 312.

Operation 310 is reached from operation 304 where it is determined in operation 308 that the mobile device can use audio echo to determine whether the mobile device is located indoors or outdoors. Operation 310 depicts using audio echo to determine whether the mobile device is located indoors or outdoors. In some embodiments, operation 310 may comprise implementing the operating procedures of FIG. 6 (after generating an audio model from implementing the operating procedures of FIG. 5). After operation 310, the operating procedures of FIG. 3 move to operation 326.

Operation 312 is reached from operation 308 where it is determined in operation 308 that the mobile device cannot use audio echo to determine whether the mobile device is located indoors or outdoors. Operation 312 depicts determining whether the mobile device can use light intensity and WiFi to determine whether the mobile device is located indoors or outdoors. In some embodiments, operation 312 may comprise determining whether the mobile device has a light intensity sensor, and a WiFi communications radio. In some embodiments, this light intensity sensor may be separate from a RGB image sensor that is able to determine light intensity.

In other embodiments, operation 312 may comprise using a light intensity sensor to determine that the light intensity is above a minimum threshold, and using the WiFi communications radio to determine that the mobile device is connected to a WiFi network. Where the light intensity is not above a minimum threshold, or the mobile device is not connected to a WiFi network, it may be determined in operation 312 that the mobile device cannot use light intensity and WiFi to determine whether the mobile device is located indoors or outdoors.

If in operation 312 it is determined that the mobile device can use light intensity and WiFi to determine whether the mobile device is located indoors or outdoors, then the operating procedures of FIG. 3 move to operation 314. Instead, if in operation 312 it is determined that the mobile device cannot use light intensity and WiFi to determine whether the mobile device is located indoors or outdoors, then the operating procedures of FIG. 3 move to operation 316.

Operation 314 is reached from operation 312 where it is determined in operation 312 that the mobile device can use light intensity and WiFi to determine whether the mobile device is located indoors or outdoors. Operation 314 depicts using light intensity and WiFi to determine whether the mobile device is located indoors or outdoors.

Figure 7:
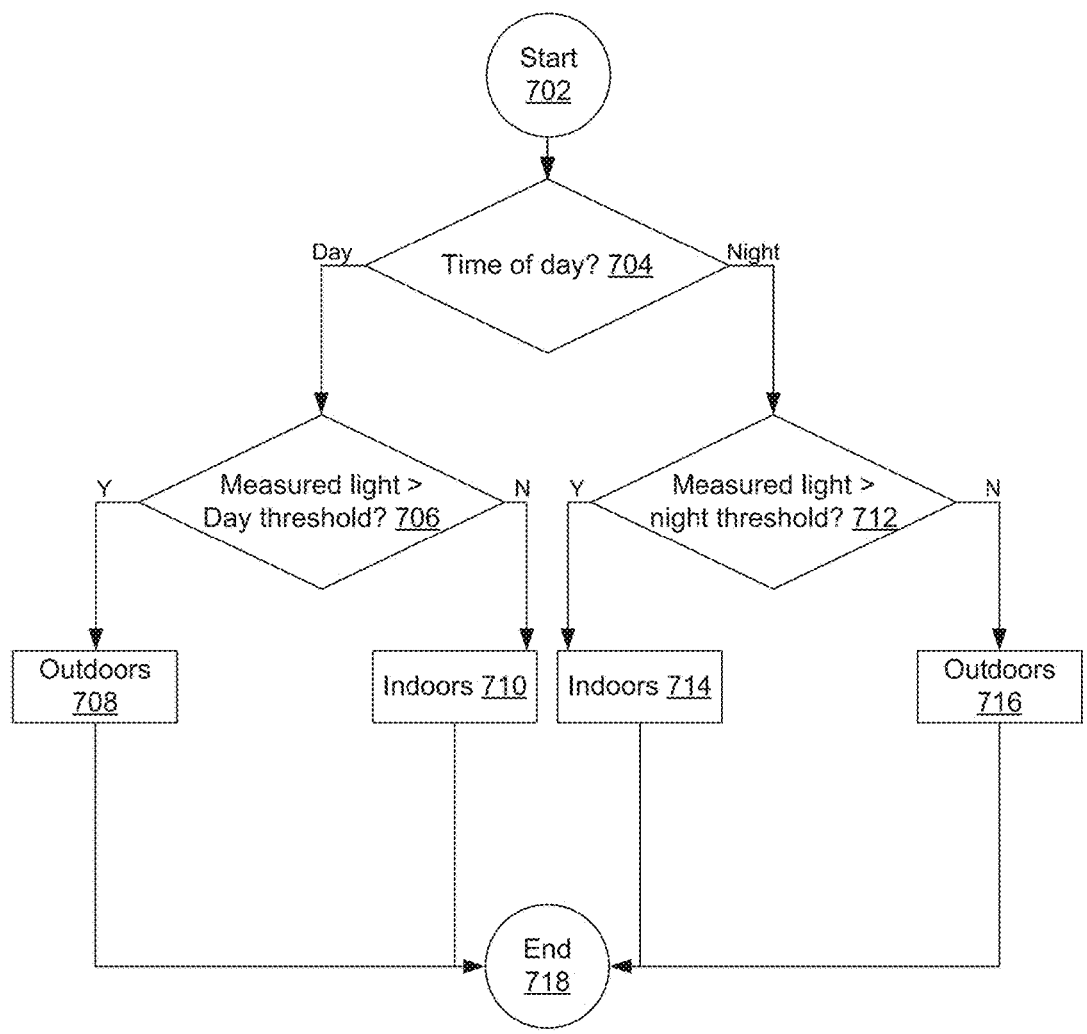
FIG. 7 depicts example operating procedures for a mobile device using light intensity to determine if it is located indoors or outdoors.
Figure 8:
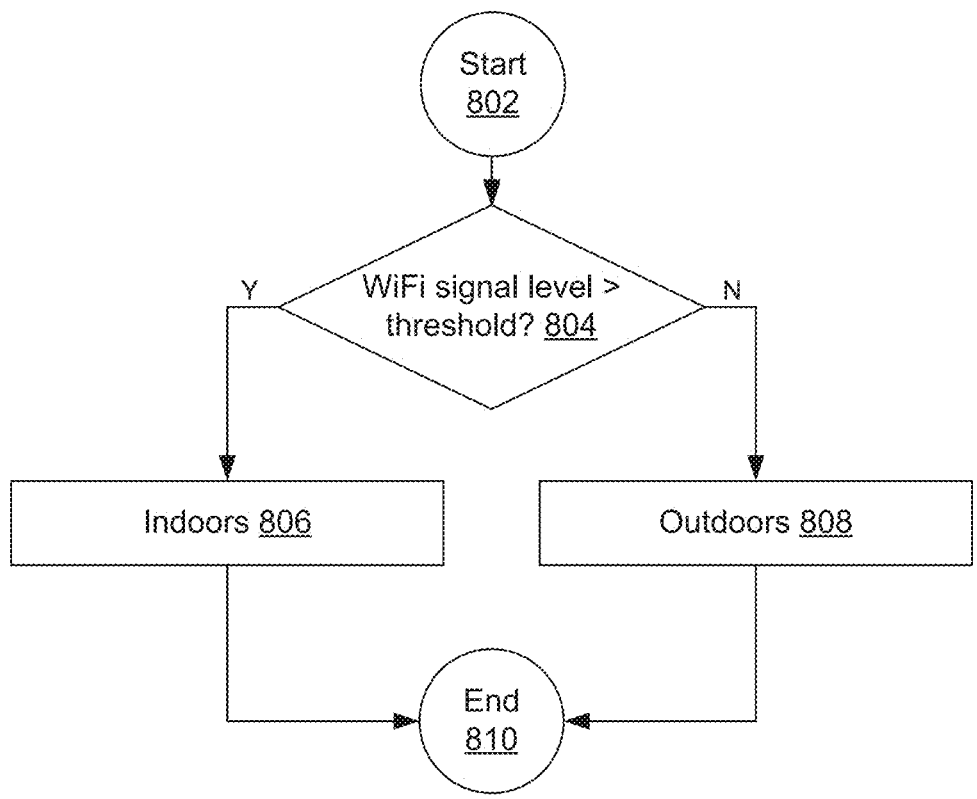
FIG. 8 depicts example operating procedures for a mobile device using WiFi to determine if it is located indoors or outdoors.
Figure 9:
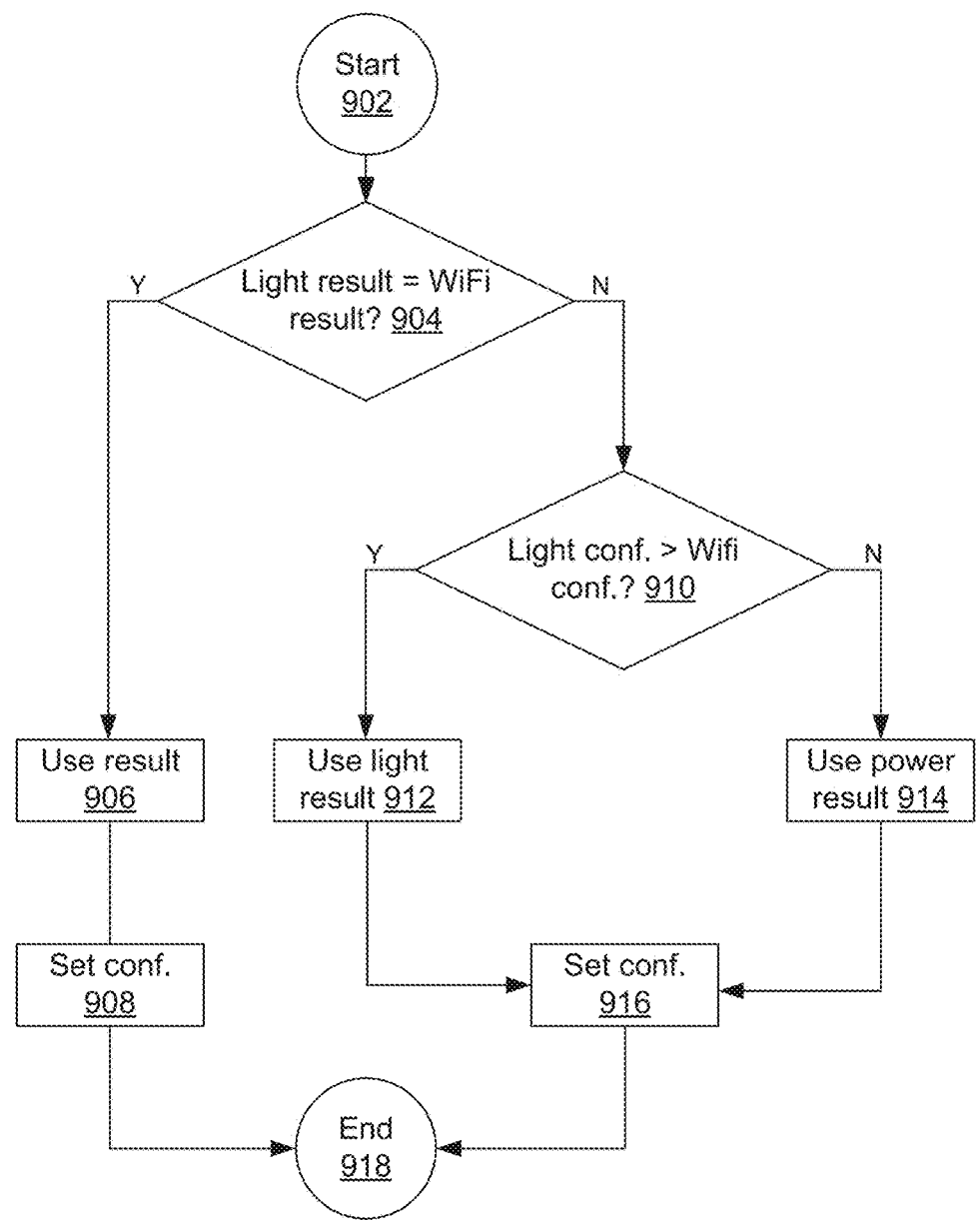
FIG. 9 depicts example operating procedures for a mobile device using a combination of light intensity and WiFi to determine if it is located indoors or outdoors.

In some embodiments, operation 314 may comprise implementing the operating procedures of FIG. 7 (to determine whether the device is located indoors or outdoors based on light intensity), the operating procedures of FIG. 8 (to determine whether the device is located indoors or outdoors based on WiFi), and the operating procedures of FIG. 9 (to determine whether the device is located indoors or outdoors based on a combination of the light intensity result of the operating procedures of FIG. 7, and the WiFi result of the operating procedures of FIG. 8). After operation 314, the operating procedures of FIG. 3 move to operation 326.

Operation 316 is reached from operation 312 where it is determined in operation 308 that the mobile device cannot use light intensity and WiFi to determine whether the mobile device is located indoors or outdoors. Operation 316 depicts determining whether the mobile device can use light intensity to determine whether the mobile device is located indoors or outdoors. This determination in operation 316 may be implemented in a similar manner as the light intensity determination of operation 312.

If in operation 316 it is determined that the mobile device can use light intensity to determine whether the mobile device is located indoors or outdoors, then the operating procedures of FIG. 3 move to operation 318. Instead, if in operation 316 it is determined that the mobile device cannot use light intensity to determine whether the mobile device is located indoors or outdoors, then the operating procedures of FIG. 3 move to operation 320.

Operation 318 is reached from operation 316 where it is determined in operation 316 that the mobile device can use light intensity to determine whether the mobile device is located indoors or outdoors. Operation 318 depicts using light intensity to determine whether the mobile device is located indoors or outdoors. In some embodiments, operation 318 may be implemented by implementing the operating procedures of FIG. 7. After operation 318, the operating procedures of FIG. 3 move to operation 326.

Operation 320 is reached from operation 316 where it is determined in operation 316 that the mobile device cannot use light intensity to determine whether the mobile device is located indoors or outdoors. Operation 320 depicts determining whether the mobile device can use WiFi to determine whether the mobile device is located indoors or outdoors. In some embodiments, operation 320 is implemented in a similar manner as determining whether the mobile device can use WiFi to determine whether the mobile device is located indoors or outdoors in operation 312.

If in operation 320 it is determined that the mobile device can use WiFi to determine whether the mobile device is located indoors or outdoors, then the operating procedures of FIG. 3 move to operation 322. Instead, if in operation 320 it is determined that the mobile device cannot use WiFi to determine whether the mobile device is located indoors or outdoors, then the operating procedures of FIG. 3 move to operation 324.

Operation 322 is reached from operation 320 where it is determined in operation 316 that the mobile device can use WiFi to determine whether the mobile device is located indoors or outdoors. Operation 322 depicts using WiFi to determine whether the mobile device is located indoors or outdoors. In some embodiments, operation 322 may be implemented in a similar manner as implementing the operating procedures of FIG. 8. After operation 322, the operating procedures of FIG. 3 move to operation 326.

Operation 324 is reached from operation 320 where it is determined in operation 320 that the mobile device cannot use WiFi to determine whether the mobile device is located indoors or outdoors. Operation 324 depicts raising an error. In some embodiments, raising an error may comprise displaying an error message on the display of the mobile device. In other embodiments, operation 324 may comprise storing an indication that a determination of whether the mobile device was located indoors or outdoors at that location could not be made. After operation 324, the operating procedures of FIG. 3 move to operation 328, where the operating procedures of FIG. 3 end.

Operation 326 is reached from operations 306, 310, 314, 318, and 322. Operation 326 depicts determining whether the mobile device is located indoors or outdoors. In some embodiments, the operating procedures of FIG. 3 will pass through one of operations 306, 310, 314, 318, and 322, and a determination of whether the mobile device is located indoors or outdoors will be made in those operations. In such a case, that determination made in operation 306, 310, 314, 318, or 322 is used in operation 326 as the determination for whether the device is located indoors or outdoors (and may have an associated confidence level, as described elsewhere).

After operation 326, the operating procedures of FIG. 3 move to operation 328, where the operating procedures of FIG. 3 end.

Determining Whether a Mobile Device is Covered

Figure 4:
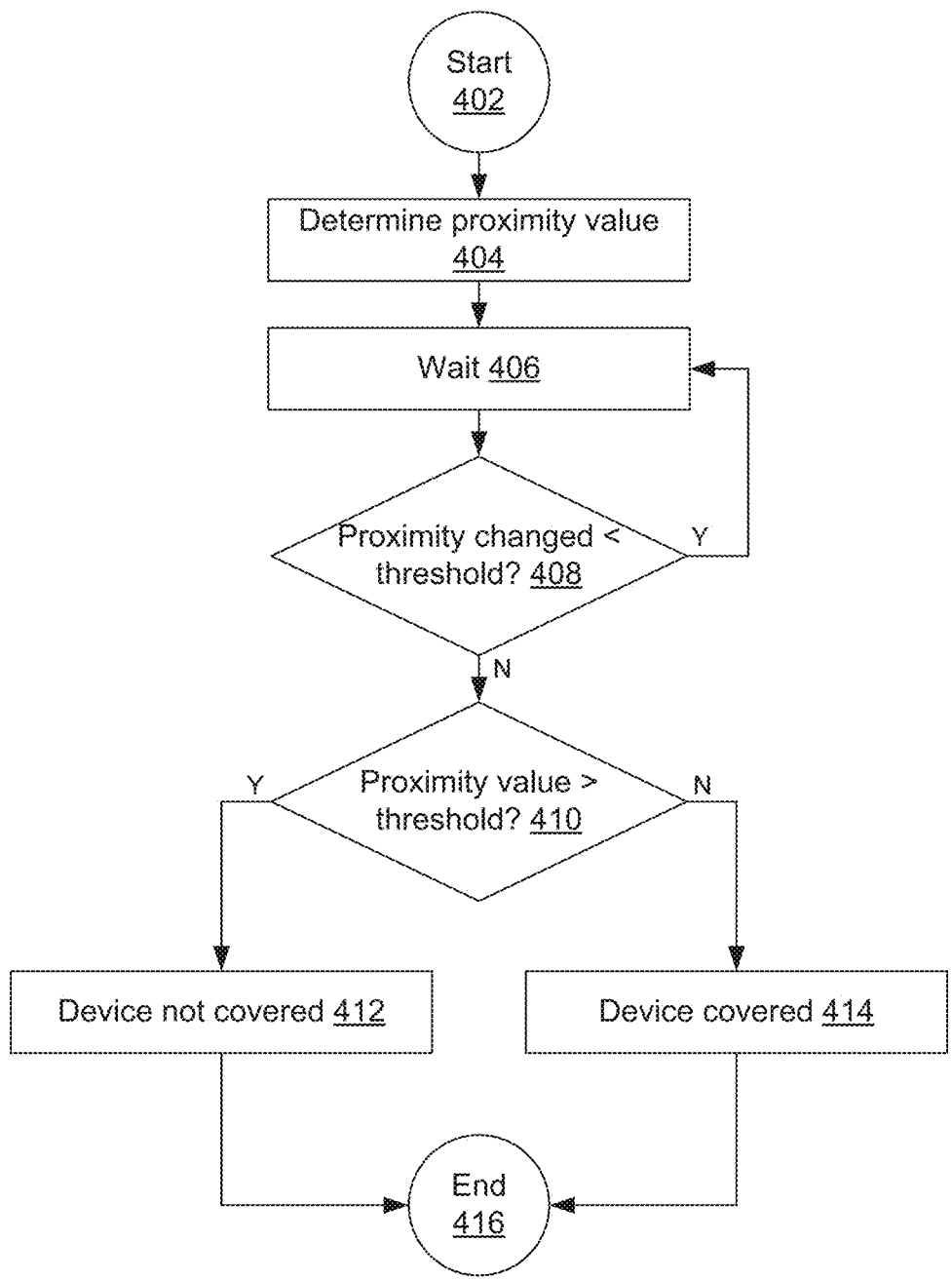
FIG. 4 depicts example operating procedures for a mobile device using a proximity sensor to determine whether it is located indoors or outdoors.

FIG. 4 depicts example operating procedures for a mobile device using a proximity sensor to determine whether it is located indoors or outdoors. In some embodiments, the operating procedures of FIG. 4 (and FIGS. 3 and 5-9) may be implemented by mobile device 100a (such as through computer-executable instructions that are stored in memory 104 and executed by processor 102). It may be appreciated that the operating procedures of FIG. 4 are example operating procedures, and that there may be embodiments that implement more or fewer operations than are depicted, or that implement the operations in a different order than is depicted here.

The operating procedures of FIG. 4 begin with operation 402, and then move to operation 404. Operation 404 depicts determining a proximity value. A mobile device may determine a proximity value using a proximity sensor, such as described with respect to FIG. 1. In some embodiments, the proximity value is a distance between the proximity sensor and an external object. In other embodiments, the proximity value may be an indication of whether or not the proximity sensor determined an external object within a threshold distance from the proximity sensor. After operation 404, the operating procedures of FIG. 4 move to operation 406.

Operation 406 depicts waiting a predetermined amount of time. In some embodiments, a timer may be set by the mobile device for the predetermined amount of time. In some embodiments, the predetermined amount of time may be a few seconds, and other lengths of time may be used in other embodiments. After operation 406, the operating procedures of FIG. 4 move to operation 408.

Operation 408 depicts determining whether the proximity value has changed more than a predetermined threshold amount. A second proximity value may be determined and compared with the proximity value determined in operation 404.

For example, if the proximity value has changed more than a predetermined threshold amount, then the mobile device is moving, or is being covered and uncovered (such as being put into or taken out of a pocket). In such situations, it may be determined that the mobile device should wait until it has stopped moving so much to determine whether it is located indoors or outdoors.

If in operation 408 it is determined that the proximity value has changed more than a predetermined threshold amount, then the operating procedures of FIG. 4 return to operation 406. Then, when the operating procedures of FIG. 4 return to operation 408 from operation 406, a determination of whether the proximity value has changed more than a predetermined amount may be made against this more recent proximity value reading rather than the proximity value reading made in operation 404.

Instead, if in operation 408 it is determined that the proximity value has not changed more than a predetermined threshold amount, then the operating procedures of FIG. 4 move to operation 410.

Operation 410 depicts determining whether the proximity value is above a threshold amount. In some embodiments, the proximity value indicates a distance between the proximity sensor and an external object. In other embodiments, the proximity value may indicate a Boolean for whether there is an external object within a predetermined threshold distance, such as 1 for Yes and 0 for No. The proximity value may be compared against the threshold amount to make the determination in operation 404.

If in operation 410 it is determined that the proximity value is above a threshold amount, then the operating procedures of FIG. 4 move to operation 412. Instead, if in operation 410 it is determined that the proximity value is not above a threshold amount, then the operating procedures of FIG. 4 move to operation 414.

Operation 412 is reached from operation 410 where in operation 410 it is determined that the proximity value is above a threshold amount. Operation 412 depicts determining that the mobile device is uncovered. This may indicate that the RGB image sensor of the mobile device is available for use in determining whether the mobile device is located indoors or outdoors because, e.g., the mobile device is not located in someone's pocket. After operation 412, the operating procedures of FIG. 4 move to operation 416, where the operating procedures of FIG. 4 end.

Operation 414 is reached from operation 410 where in operation 410 it is determined that the proximity value is not above a threshold amount. Operation 414 depicts determining that the mobile device is covered. This may indicate that the RGB image sensor of the mobile device is unavailable for use in determining whether the mobile device is located indoors or outdoors because, e.g., the mobile device is located in someone's pocket. After operation 414, the operating procedures of FIG. 4 move to operation 416, where the operating procedures of FIG. 4 end.

In some embodiments, a mobile device using a proximity sensor to determine whether it is located indoors or outdoors may be effectuated by computer-executable instructions represented by this pseudocode:
  Step 1. Get Proximity_value
  Step 2. Start to wait
  If (Proximity_value changes during waiting time);
  Go to step 2;
  Else, go to step 3
  Step 3. If (Proximity_value>1):
    Device is not close to objects
  Else:
    Device is covered by objects.

Training an Audio Echo Model

Figure 5:
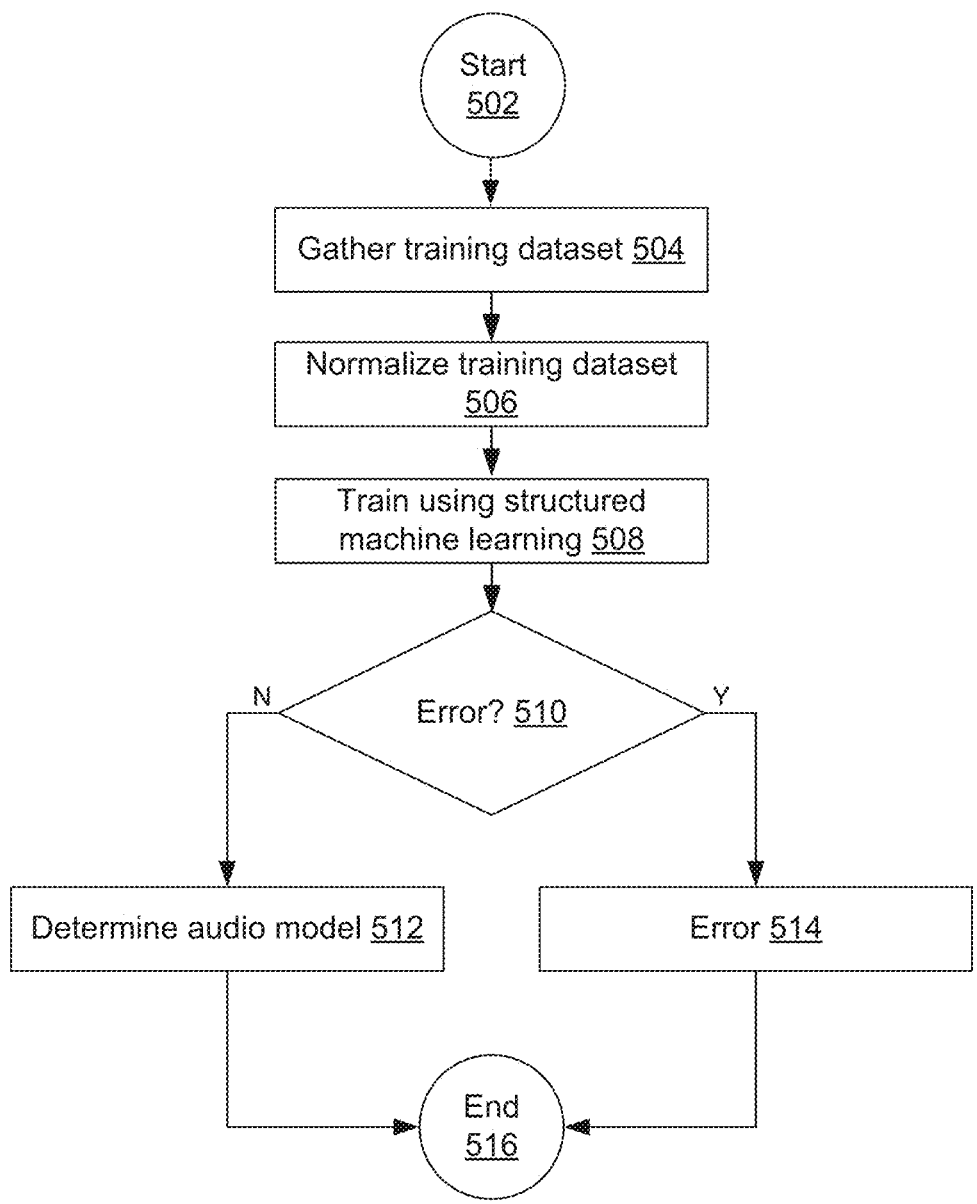
FIG. 5 depicts example operating procedures for training a mobile device to use audio echo to determine whether it is located indoors or outdoors.

FIG. 5 depicts example operating procedures for training a mobile device to use audio echo to determine whether it is located indoors or outdoors. In some embodiments, the operating procedures of FIG. 5 (and FIGS. 3-4 and 6-9) may be implemented by mobile device 100a (such as through computer-executable instructions that are stored in memory 104 and executed by processor 102). In other embodiments, the operating procedures of FIG. 5 may be implemented on one mobile device or other computing device to determine a model for using audio echo to determine whether a mobile device is located indoors or outdoors. Then, that model may be transferred to another mobile device to determine for that second mobile device whether it is located indoors or outdoors.

It may be appreciated that the operating procedures of FIG. 5 are example operating procedures, and that there may be embodiments that implement more or fewer operations than are depicted, or that implement the operations in a different order than is depicted here.

The operating procedures of FIG. 5 begin with operation 502, and then move to operation 504. Operation 504 depicts gathering a training dataset. A training dataset may comprise a set of recorded echoes of audio that is played by a mobile device's speaker, along with an indication of whether, for each echo, the mobile device was located indoors or outdoors at the time. This training set may be generated from a different mobile device (or mobile devices) than the mobile device with which an audio echo model generated according to the operating procedures of FIG. 5 is used. After operation 504, the operating procedures of FIG. 5 move to operation 506.

Operation 506 depicts normalizing the training dataset. For example, in some embodiments, each piece of data in the training set may be normalized by scaling it from whatever it may range over to a range from [0, 1]. After operation 506, the operating procedures of FIG. 5 move to operation 508.

Operation 508 depicts training a model using structured machine learning. In some embodiments, performing operation 508 may comprise providing the normalized training dataset as input to a LIBLINEAR linear classification library. A LIBLINEAR linear classification library may process the input and produce a corresponding output, where the output is an audio model that itself takes unstructured (i.e., lacking an indication of whether the information corresponds to being indoors or outdoors) audio information as input and produces an indication of whether that audio information corresponds to being indoors or outdoors as output. After operation 508, the operating procedures of FIG. 5 move to operation 510.

Operation 510 depicts determining whether there is an error. In some embodiments, it may be that the structured machine learning of operation 508 produces an error indicating that an audio model was not generated in operation 508, rather than producing an audio model. In such embodiments, this error may be identified in operation 510.

If in operation 510 it is determined that there is not an error, the operating procedures of FIG. 5 move to operation 512. Instead, if in operation 510 it is determined that there is an error, the operating procedures of FIG. 5 move to operation 514.

Operation 512 is reached from operation 510 where in operation 510 it is determined that there is not an error. Operation 512 depicts determining an audio model. This determined audio model may be the audio model determined in operation 508, where operation 508 successfully produced an audio model rather than an error. After operation 512, the operating procedures of FIG. 5 move to operation 516, where the operating procedures of FIG. 5 end.

Operation 514 is reached from operation 510 where in operation 510 it is determined that there is an error. Operation 514 depicts raising an error. In some embodiments, operation 514 may comprise providing an alert of the error to a user, such as by displaying it on the display of a user. After operation 514, the operating procedures of FIG. 5 move to operation 516, where the operating procedures of FIG. 5 end.

In some embodiments, the operating procedures of FIG. 5 may be implemented to, before emitting an audible signal from the mobile device (as in the operating procedures of FIG. 6), use structured machine on a plurality of reflected audio signals and corresponding indications of whether each of the plurality of reflected audio signals corresponds to indoors or outdoors.

In some embodiments, training a mobile device to use audio echo to determine whether it is located indoors or outdoors may be effectuated by computer-executable instructions represented by this pseudocode:

Step 1: Gather training echo dataset and obtain their features:

$$(x_{feature}=[\Sigma echo, N_{peak}, Ave_{variance}, Max_{variance}])$$

Step 2: Scale feature vector (normalize elements in feature vector to be in [0,1])

Step 3: Train the model using gathered audio echo data by a machine learning process Step 4: Obtain audio echo model The audio echo may be taken with samples at a rate of $f_s$=48,000 Hz. Then, in some embodiments, 300 samples may be taken ($N_{sample}$=300) of a resulting echo, between 600 and 1,500 samples at 48,000 Hz from when the audio is emitted ($E_1$=600, $E_2$=1500). By taking samples in this time period, the mobile device may focus on echoes reflected by objects that are approximately 2.125-5.3 m away from the mobile device. Where the velocity of sound in air is approximately 340 m/s, then the echo from objects that are 2.125-5.3 m away are at echoes sequence [600,1500] (2.125*2/340*48,000=600, and 5.3*2/340*48,000≈1500). At the end of playing chirp, the echo reflected by furthest objects is 1.0625 m, (300/48,000*340/2=1.0625) away, which does not mix with the echo that the mobile device analyzes.

Determining Whether a Device is Located Indoors or Outdoors with Audio Echo

FIG. 6 depicts example operating procedures for a mobile device using audio echo to determine whether it is located indoors or outdoors (such as with an audio echo model generated from the operating procedures of FIG. 5). In some embodiments, the operating procedures of FIG. 6 (and FIGS. 3-5 and 7-9) may be implemented by mobile device 100a (such as through computer-executable instructions that are stored in memory 104 and executed by processor 102). It may be appreciated that the operating procedures of FIG. 6 are example operating procedures, and that there may be embodiments that implement more or fewer operations than are depicted, or that implement the operations in a different order than is depicted here.

The operating procedures of FIG. 6 begin with operation 602, and then move to operation 604. Operation 604 depicts playing a sound. This sound may be a sound emitted by a speaker of a mobile device. After operation 604, the operating procedures of FIG. 6 move to operation 606.

Operation 606 depicts recording an echo. This echo may be an echo of the sound of operation 604 that has bounced off of an external object and directed back to the mobile device, where it is recorded by a microphone of the mobile device. After operation 606, the operating procedures of FIG. 6 move to operation 608.

Operation 608 depicts normalizing the echo. In some embodiments, normalizing the echo in operation 608 may be performed in a similar manner as normalizing the training dataset in operation 506 of FIG. 5. After operation 608, the operating procedures of FIG. 6 move to operation 610.

Operation 610 depicts applying the normalized echo to the model. In some embodiments, this model may be the audio model determined in operation 512 of FIG. 5. This audio model may have been generated via machine learning. This audio model may take an audio echo as input and produce as output an indication of whether the input echo corresponds to the mobile device being located indoors or outdoors.

If in operation 610 it is determined that there is a result from applying the normalized echo to the model, the operating procedures of FIG. 6 move to operation 612. Instead, if in operation 610 it is determined that there is an error from applying the normalized echo to the model, the operating procedures of FIG. 6 move to operation 614.

Operation 612 is reached from operation 610 where it is determined in operation 610 that there is a result from applying the normalized echo to the model. Operation 612 depicts determining a result and confidence. In some embodiments, in addition to producing a result of whether the audio echo corresponds to the mobile device being located indoors or outdoors, the audio model may also produce a confidence level that that result is correct. After operation 612, the operating procedures of FIG. 6 move to operation 616, where the operating procedures of FIG. 6 end.

Operation 614 is reached from operation 610 where it is determined in operation 610 that there is not a result from applying the normalized echo to the model. Operation 614 depicts raising an error. In some embodiments, the audio model may fail to produce a valid result for a particular echo input. In such cases, an error may be raised, and this may be performed in a similar manner as raising an error in operation 514 of FIG. 5.

After operation 612, the operating procedures of FIG. 6 move to operation 616, where the operating procedures of FIG. 6 end.

In some embodiments, the operating procedures of FIG. 6 may be implemented to, in response to determining that the mobile device cannot identify the nonzero amount of light intensity in the physical environment of the mobile device, and to determining that the mobile device is not connected to the WiFi network, emit an audible signal from the mobile device. Then, receive, by a microphone the mobile device, a reflection of the audio signal. Finally, determine whether the mobile device is located indoors or outdoors based on the reflection of the audio signal.

In some embodiments, a mobile device using audio echo to determine whether it is located indoors or outdoors may be effectuated by computer-executable instructions represented by this pseudocode:

Step 1: Play chirp and obtain its echo feature:

$$(x_{feature}=[\Sigma echo, N_{peak}, Ave_{variance}, Max_{variance}])$$

Step 2: Scale feature vector (normalize elements in feature vector to be in [0,1])

Step 3: Predict the result and confidence of results by audio echo model

Determining Whether a Device is Located Indoors or Outdoors with Light Intensity FIG. 7 depicts example operating procedures for a mobile device using light intensity to determine if it is located indoors or outdoors. In some embodiments, the operating procedures of FIG. 7 (and FIGS. 3-6 and 8-9) may be implemented by mobile device 100a (such as through computer-executable instructions that are stored in memory 104 and executed by processor 102). It may be appreciated that the operating procedures of FIG. 7 are example operating procedures, and that there may be embodiments that implement more or fewer operations than are depicted, or that implement the operations in a different order than is depicted here.

The operating procedures of FIG. 7 being with operation 702, and then move to operation 704. Operation 704 depicts determining the time of day. In some embodiments, the mobile device may maintain a system clock that identifies a current time, and which is accessible via an API call. In such embodiments, operation 704 may comprise making such an API call to determine the current time and then determine whether the current time is during daytime or nighttime. In some embodiments, operation 704 comprises determining whether a time of day for the mobile device corresponds to day time or night time.

Whether the current time is during daytime or during nighttime may be performed by comparing the current time to an indication of whether that time is daytime or nighttime. This indication of whether the time is daytime or nighttime may vary based on the day of the year. For example, during the winter in the Northern Hemisphere it may be considered to be daytime from 7 am through 5 pm, inclusive, and otherwise nighttime. And during the summer in the Northern Hemisphere, when it is light longer during a day, it may be considered to be daytime from 6 am through 8 pm, inclusive, and otherwise nighttime.

Where in operation 704 it is determined that the time of day is during the daytime, the operating procedures of FIG. 7 move to operation 706. Instead, where in operation 704 it is determined that the time of day is during the nighttime, then the operating procedures of FIG. 7 move to operation 712.

Operation 706 is reached from operation 704 where it is determined in operation 704 that the time of day is during the daytime. Operation 706 depicts determining whether the light is above a daytime threshold amount of light. This may comprise measuring an amount of light in the physical environment of the mobile device with a light intensity sensor, and then comparing that to a predetermined daytime threshold amount of light. A daytime threshold amount of light may be a predetermined amount of light, above which, it is considered that there is enough light that it is likely that the measured light corresponds to the mobile device being located outdoors, and below which, it is considered that there is an amount of light that it is likely that the measured light corresponds to the mobile device being located indoors.

Where in operation 706 it is determined that the light is above a daytime threshold amount of light, the operating procedures of FIG. 7 move to operation 708. Instead, where in operation 706 it is determined that the light is not above the daytime threshold amount of light, the operating procedures of FIG. 7 move to operation 710.

Operation 708 is reached from operation 706 where it is determined that the light is above a daytime threshold amount of light. Operation 708 depicts determining that the mobile device is located outdoors. In some embodiments, operation 708 also includes determining a confidence level that the device is located outdoors. This confidence level may be determined as $Confidence_{light}=(Light-daytime_{light\_threshold})/Light$. After operation 708, the operating procedures of FIG. 7 move to operation 718, where the operating procedures of FIG. 7 end.

Operation 710 is reached from operation 706 where it is determined that the light is not above a daytime threshold amount of light. Operation 710 depicts determining that the mobile device is located indoors. In some embodiments, operation 710 also includes determining a confidence level that the device is located indoors. This confidence level may be determined as $Confidence_{light}=(daytime_{light\_threshold}-Light)/daytime_{light\_threshold}$. After operation 710, the operating procedures of FIG. 7 move to operation 718, where the operating procedures of FIG. 7 end.

Operation 712 is reached from operation 704 where it is determined in operation 704 that the time of day is during the nighttime. Operation 712 depicts determining whether the light is above a nighttime threshold amount of light. Operation 712 may be performed in a similar manner as operation 706 but with a predetermined nighttime threshold here rather than the predetermined daytime threshold of operation 706. The nighttime threshold may be an amount of light, below which it is determined that the mobile device is located outdoors (based on a belief that, during the night, there is likely to be more light indoors where there is usually ample artificial light, than outdoors).

Where in operation 712 it is determined that the light is above a nighttime threshold amount of light, the operating procedures of FIG. 7 move to operation 714. Instead, where in operation 712 it is determined that the light is not above the nighttime threshold amount of light, the operating procedures of FIG. 7 move to operation 716.

Operation 714 is reached from operation 712 where it is determined that the light is above a nighttime threshold amount of light. Operation 714 depicts determining that the mobile device is located indoors. In some embodiments, operation 714 also includes determining a confidence level that the device is located indoors. This confidence level may be determined as $Confidence_{light}=(Light-night_{light\_threshold})/Light$. After operation 714, the operating procedures of FIG. 7 move to operation 718, where the operating procedures of FIG. 7 end.

Operation 716 is reached from operation 712 where it is determined that the light is not above a nighttime threshold amount of light. Operation 716 depicts determining that the mobile device is located outdoors. In some embodiments, operation 716 also includes determining a confidence level that the device is located outdoors. This confidence level may be determined as $Confidence_{light}=(night_{light\_threshold}-Light)/night_{light\_threshold}$. After operation 716, the operating procedures of FIG. 7 move to operation 718, where the operating procedures of FIG. 7 end.

In some embodiments, a mobile device using light intensity to determine if it is located indoors or outdoors may be effectuated by computer-executable instructions represented by this pseudocode, where a result of 0 corresponds to indoors and a result of 1 corresponds to outdoors:

Step 1: Check system time. If daytime, go to step 2; else, go to step 3.

Step 2. If $(Light>daytime_{light\_threshold})$:

```
{
    Result_light = 1;
    Confidence_light = (Light − daytime_light_threshold) / Light;}
Else
{
    Result_light = 0;
    Confidence_light = (daytime_light_threshold − Light) / daytime_light_threshold;
}
Step 3.    If (Light > night_light_threshold) :
{
    Result_light = 0;
    Confidence_light = (Light − night_light_threshold) / Light;
}
Else
{
    Result_light = 1;
    Confidence_light = (night_light_threshold − Light) / night_light_threshold;
}
```

Determining Whether a Device is Located Indoors or Outdoors with WiFi

FIG. 8 depicts example operating procedures for a mobile device using WiFi to determine if it is located indoors or outdoors. In some embodiments, the operating procedures of FIG. 8 (and FIGS. 3-6 and 9) may be implemented by mobile device 100a (such as through computer-executable instructions that are stored in memory 104 and executed by processor 102). It may be appreciated that the operating procedures of FIG. 8 are example operating procedures, and that there may be embodiments that implement more or fewer operations than are depicted, or that implement the operations in a different order than is depicted here.

The operating procedures of FIG. 8 begin with operation 802, and then move to operation 804. Operation 804 depicts determining whether a WiFi signal level is above a predetermined threshold. In some embodiments, a WiFi signal level may be a signal strength associated with a WiFi network to which the mobile device is connected. In other embodiments, this WiFi signal level may be a signal strength of one or more WiFi networks that are visible to the mobile device. The mobile device may have an API for accessing this WiFi signal level, and this API may be utilized in operation 804 to determine the WiFi signal level.

If in operation 804 it is determined that the WiFi signal level is above the predetermined threshold, then the operating procedures of FIG. 8 move to operation 806. Instead, if in operation 804 it is determined that the WiFi signal level is not above the predetermined threshold, then the operating procedures of FIG. 8 move to operation 808.

Operation 806 is reached from operation 804 where it is determined in operation 804 that the WiFi signal is above the predetermined threshold. Operation 806 depicts determining that the mobile device is located indoors. In some embodiments, operation 806 includes determining a confidence level that the mobile device is located indoors. This confidence level may be determined as $Confidence_{WiFi}=(WiFi_{RSSI}-WiFi_{threshold})/abs(WiFi_{threshold})+0.6$. After operation 806, the operating procedures of FIG. 8 move to operation 810, where the operating procedures of FIG. 8 end.

Operation 808 is reached from operation 804 where it is determined in operation 804 that the WiFi signal is not above the predetermined threshold. Operation 808 depicts determining that the mobile device is located outdoors. In some embodiments, operation 808 includes determining a confidence level that the mobile device is located indoors. This confidence level may be determined as $Confidence_{WiFi}=(WiFi_{threshold}-WiFi_{RSSI})/abs(WiFi_{threshold})+0.6$. After operation 808, the operating procedures of FIG. 8 move to operation 810, where the operating procedures of FIG. 8 end.

In some embodiments, a mobile device using WiFi to determine if it is located indoors or outdoors may be effectuated by computer-executable instructions represented by this pseudocode, where a result of 0 corresponds to indoors and a result of 1 corresponds to outdoors:

```
If ( WiFi_RSSI > WiFi_threshold )
{
    Result_WiFi = 0;
    Confidence_WiFi = (WiFi_RSSI - WiFi_threshold ) / abs(WiFi_threshold ) + 0.6;
}
Else
{
    Result_WiFi = 1;
    Confidence_WiFi = (WiFi_threshold - WiFi_RSSI ) / abs(WiFi_threshold) +0.6;
}
```

Determining Whether a Device is Located Indoors or Outdoors with Light Intensity and WiFi FIG. 9 depicts example operating procedures for a mobile device using a combination of light intensity (such as described with respect to the operating procedures of FIG. 7) and WiFi (such as described with respect to the operating procedures of FIG. 8) to determine if it is located indoors or outdoors. In some embodiments, the operating procedures of FIG. 9 (and FIGS. 3-8) may be implemented by mobile device 100a (such as through computer-executable instructions that are stored in memory 104 and executed by processor 102). It may be appreciated that the operating procedures of FIG. 9 are example operating procedures, and that there may be embodiments that implement more or fewer operations than are depicted, or that implement the operations in a different order than is depicted here.

The operating procedures of FIG. 9 begin with operation 902, and then move to operation 904. Operation 904 depicts determining whether the result from using light intensity (e.g., as in FIG. 7) is the same as the result from using WiFi (e.g., as in FIG. 8). That is, operation 904 comprises determining whether both the result from using light intensity and the result from using WiFi is indoors, or both the result from using light intensity and the result from using WiFi is outdoors.

If in operation 904 it is determined that the result from using light intensity is the same as the result from using WiFi, then the operating procedures of FIG. 9 move to operation 906. Instead, if in operation 904 it is determined that the result from using light intensity is different from the result from using WiFi, then the operating procedures of FIG. 9 move to operation 910.

Operation 906 is reached from operation 904 where it is determined in operation 904 that the result from using light intensity is the same as the result from using WiFi. Operation 906 depicts using that result, as the result. For example, either both the result from using light intensity and the result from using WiFi is indoors, and indoors will be used as the result, or both the result from using light intensity and the result from using WiFi is outdoors, and outdoors will be used as the result. After operation 906, the operating procedures of FIG. 9 move to operation 908.

Operation 908 depicts determining a confidence level. This confidence level is a confidence level that the result of operation 906 (be it indoors or outdoors) is correct. This confidence level may be determined as $Confidence=1-(1-Confidence_{light})\times(1-Confidence_{WiFi})$. After operation 908, the operating procedures of FIG. 9 move to operation 918, where the operating procedures of FIG. 9 end.

Operation 910 is reached from operation 904 where it is determined in operation 904 that the result from using light intensity is different from the result from using WiFi. Operation 910 depicts determining whether the confidence level for the result for light is greater than the confidence level for the result for WiFi. This confidence level for light may have been determined in one of operations 708, 710, 714, and 716 of FIG. 7. And this confidence level for WiFi may have been determined in operations 806 or 808 of FIG. 8. Where these two confidence levels range over the same values (e.g., [0, 1]), these two confidence levels may be directly compared, and the greater number determined.

If in operation 910 it is determined that the confidence level for the result for light is greater than the confidence level for the result for WiFi, then the operating procedures of FIG. 9 move to operation 912. Instead, if in operation 910 it is determined that the confidence level for the result for light is not greater than the confidence level for the result for WiFi, then the operating procedures of FIG. 9 move to operation 912.

Operation 912 is reached from operation 910 where in operation 910 it is determined that the confidence level for the result for light is greater than the confidence level for the result for WiFi. Operation 912 depicts using the result from light. This result from light may be the result of one of operations 708, 710, 714, and 716 of FIG. 7 that is either indoors or outdoors. After operation 912, the operating procedures of FIG. 9 move to operation 916.

Operation 914 is reached from operation 910 where in operation 910 it is determined that the confidence level for the result for light is not greater than the confidence level for the result for WiFi. Operation 914 depicts using the result from WiFi. This result from WiFi may be the result of one of operations 806 and 808 of FIG. 8 that is either indoors or outdoors. After operation 914, the operating procedures of FIG. 9 move to operation 916.

Operation 916 is reached from operations 912 and 914. Operation 916 depicts determining a confidence level. This confidence level of operation 916 is a confidence level that the result used (the indication of indoors or outdoors from one of operations 912 and 914) is correct. This confidence level may be determined as Confidence={Confidence$_{light}^{(Result==Resultlight)}$*(1−Confidence$_{light}^{(!(Result==Resultlight))}$}*{(Confidence$_{WiFi}^{(Result==Result_{WiFi})}$*(1−Confidence$_{WiFi})^{(!(Result==Result\_WiFi))}$}. After operation 916, the operating procedures of FIG. 9 move to operation 918, where the operating procedures of FIG. 9 end.

In some embodiments, the operating procedures of FIG. 9 may be implemented to, in response to determining that the time of day for the mobile device corresponds to night time, determine whether the mobile device is connected to a WiFi network, and determine whether the mobile device can identify a nonzero amount of light intensity in a physical environment of the mobile device. Then, in response to determining that the mobile device is connected to the WiFi network, and to determining that the mobile device can identify the nonzero amount of light intensity in the physical environment of the mobile device, determine whether the mobile device is located indoors or outdoors based on the mobile device being connected to the WiFi network, and to the nonzero amount of light intensity of the physical environment of the mobile device.

Where there is some light, but no WiFi network, in some embodiments, the operating procedures of FIG. 9 may be implemented to, in response to determining that the mobile device is not connected to the WiFi network, and to determining that the mobile device can identify the nonzero amount of light intensity in the physical environment of the mobile device, determine whether the mobile device is located indoors or outdoors based on the nonzero amount of light intensity of the physical environment of the mobile device, and independently of information from the WiFi network.

Where there is a WiFi network, but no light (or under a threshold amount of light), in some embodiments, the operating procedures of FIG. 9 may be implemented to, in response to determining that the mobile device cannot identify the nonzero amount of light intensity in the physical environment of the mobile device, determine whether the mobile device is located indoors or outdoors based on being connected to the WiFi network, and independently of the zero amount of light intensity of the physical environment of the mobile device.

In some embodiments, a mobile device using a combination of light intensity and WiFi to determine if it is located indoors or outdoors may be effectuated by computer-executable instructions represented by this pseudocode, where a result of 0 corresponds to indoors and a result of 1 corresponds to outdoors:

Step 1: Power=Confidence$_{light}$>Confidence$_{WiFi}$? 1:0
Step 2: Result=[Result$_{light}^{Power}$]*[Result$_{WiFi}^{(1-Power)}$]
Step 3: If (Result$_{light}$==Result$_{WiFi}$)

```
{
    Confidence = 1 − (1 − Confidence_light) × (1 − Confidence_WiFi)
};
Else
{
    Confidence =
    {
        Confidence_light^(Result == Resultlight) *
        (1 − Confidence_light)^(!(Result == Resultlight))
    }*
    {
        (Confidence_WiFi^(Result == Result_WiFi) *
        (1 − Confidence_WiFi)^(!(Result==Result_WiFI)))
    }
}
```

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining whether a mobile device is located indoors or outdoors, comprising:
    determining whether a time of day for the mobile device corresponds to day time or night time; and
    in response to determining that the time of day for the mobile device corresponds to day time,
        determining whether the mobile device has an image sensor that is accessible;
        determining whether the mobile device has a proximity sensor that is accessible;
        in response to determining that the mobile device has the image sensor that is accessible and the proximity sensor that is accessible, determining whether the proximity sensor indicates that a distance between the mobile device and an object observable by the proximity sensor is above a predetermined threshold distance; and
        in response to determining that the proximity sensor indicates that the distance between the mobile device and the object observable by the proximity sensor is above the predetermined threshold distance, determining whether the mobile device is located indoors or outdoors based on the image sensor of the mobile device.

2. The method of claim 1, wherein determining whether the mobile device is located indoors or outdoors based on the image sensor of the mobile device comprises:
    determining whether the mobile device is located indoors or outdoors based on a light intensity determined from the image sensor, a red color temperature determined from the image sensor, a blue color temperature determined from the image sensor, and a green color temperature determined from the image sensor.

3. The method of claim 1, further comprising:
    in response to determining that the time of day for the mobile device corresponds to night time,
    determining whether the mobile device is connected to a WiFi network;
    determining whether the mobile device can identify a nonzero amount of light intensity in a physical environment of the mobile device; and
    in response to determining that the mobile device is connected to the WiFi network, and to determining that the mobile device can identify the nonzero amount of light intensity in the physical environment of the mobile device, determining whether the mobile device is located indoors or outdoors based on the mobile device being connected to the WiFi network, and to the nonzero amount of light intensity of the physical environment of the mobile device.

4. The method of claim 3, further comprising:
    in response to determining that the mobile device is not connected to the WiFi network, and to determining that the mobile device can identify the nonzero amount of light intensity in the physical environment of the mobile device, determining whether the mobile device is located indoors or outdoors based on the nonzero amount of light intensity of the physical environment of the mobile device, and independently of information from the WiFi network.

5. The method of claim 3, further comprising:
    in response to determining that the mobile device cannot identify the nonzero amount of light intensity in the physical environment of the mobile device, determining whether the mobile device is located indoors or outdoors based on being connected to the WiFi network, and independently of a zero amount of light intensity of the physical environment of the mobile device.

6. The method of claim 3, further comprising:
    in response to determining that the mobile device cannot identify the nonzero amount of light intensity in the physical environment of the mobile device, and to determining that the mobile device is not connected to the WiFi network, emitting an audio signal from the mobile device;
    receiving, by a microphone the mobile device, a reflection of the audio signal; and
    determining whether the mobile device is located indoors or outdoors based on the reflection of the audio signal.

7. The method of claim 6, further comprising:
    before emitting the audio signal from the mobile device, using a structured machine on a plurality of reflected audio signals and corresponding indications of whether each of the plurality of reflected audio signals corresponds to indoors or outdoors.

8. The method of claim 1, wherein determining whether the time of day corresponds to day time or night time comprises:
    determining whether the time of day for the mobile device corresponds to day time or night time based on a system clock of the mobile device.

9. A system, comprising:
    at least one processor; and
    at least one memory communicatively coupled to the at least one processor when the system is operational, the at least one memory bearing processor-executable instructions that, upon execution by the at least one processor, cause the system at least to:
        determine whether a time of day for the system corresponds to day time or night time;
        in response to determining that the time of day for the system corresponds to day time, and in response to determining that the system has an image sensor that is accessible, determine whether a proximity sensor of the system indicates that the image sensor of the system is covered; and
        in response to determining that the proximity sensor of the system indicates that the image sensor of the system is covered:
            emit an audio signal from the system;
            receive, by a microphone of the system, a reflection of an audio signal; and
            determine whether the system is located indoors or outdoors based on the reflection of the audio signal.

10. The system of claim 9, wherein the instructions that, upon execution by the at least one processor, further cause the system at least to:
    in response to determining that the proximity sensor of the system indicates that the image sensor of the system is uncovered, determine whether the system is located indoors or outdoors based on a light intensity determined from the image sensor of the system.

11. The system of claim 9, wherein the instructions that, upon execution by the at least one processor, further cause the system at least to:
    in response to determining that the time of day for the system corresponds to night time, determine whether the system is located indoors or outdoors based on the system being connected to a WiFi network, and to a nonzero amount of light intensity of a physical environment of the system.

12. The system of claim 11, wherein the instructions that, upon execution by the at least one processor, further cause the system at least to:
    in response to determining that the system is not connected to the WiFi network, determine whether the system is located indoors or outdoors based on the nonzero amount of light intensity of the physical environment of the system, and independently of information from the WiFi network.

13. The system of claim 11, wherein the instructions that, upon execution by the at least one processor, further cause the system at least to:
    in response to determining that the system cannot identify the nonzero amount of light intensity in the physical environment of the system, determine whether the system is located indoors or outdoors based on being connected to the WiFi network, and independently of a zero amount of light intensity of the physical environment of the system.

14. The system of claim 11, wherein the instructions that, upon execution by the at least one processor, further cause the system at least to:

in response to determining that the system cannot identify the nonzero amount of light intensity in the physical environment of the system, and to determining that the system is not connected to the WiFi network, emit an audio signal from the system;

receive, by a microphone of the system, a reflection of the audio signal; and determine whether the system is located indoors or outdoors based on the reflection of the audio signal.

15. A non-transitory computer-readable storage medium of a mobile device, bearing computer-executable instructions that, when executed upon a computing device, cause the mobile device at least to:

determine whether a time of day for the mobile device corresponds to day time or night time;

in response to determining that the time of day for the mobile device corresponds to day time, and in response to determining that the mobile device has an image sensor that is accessible, determine whether a proximity sensor of the mobile device indicates that the image sensor of the mobile device is covered; and in response to determining that the proximity sensor of the mobile device indicates that the mobile device is covered;

emit an audio signal from the mobile device;

receive, by a microphone of the mobile device, a reflection of the audio signal; and determine whether the mobile device is located indoors or outdoors based on the reflection of the audio signal.

16. The non-transitory computer-readable storage medium of claim 15, further bearing computer-executable instructions that, when executed upon a computing device, cause the computing device at least to:

in response to determining that the time of day for the mobile device corresponds to night time, determine whether the mobile device is located indoors or outdoors based on the mobile device being connected to a WiFi network, and to a nonzero amount of light intensity of a physical environment of the mobile device.

17. The non-transitory computer-readable storage medium of claim 15, further bearing computer-executable instructions that, when executed upon a computing device, cause the computing device at least to:

in response to determining that the mobile device cannot identify a nonzero amount of light intensity in a physical environment of the mobile device, and to determining that the mobile device is not connected to a WiFi network, emit an audio signal from the mobile device;

receive, by a microphone of the mobile device, a reflection of the audio signal; and determine whether the mobile device is located indoors or outdoors based on the reflection of the audio signal.

18. The non-transitory computer-readable storage medium of claim 17, further bearing computer-executable instructions that, when executed upon a computing device, cause the computing device at least to:

before emitting the audio signal from the mobile device, use a structured machine on a plurality of reflected audio signals and corresponding indications of whether each of the plurality of reflected audio signals corresponds to indoors or outdoors.

19. The non-transitory computer-readable storage medium of claim 16, further bearing computer-executable instructions that, when executed upon a computing device, cause the computing device at least to:

in response to determining that the mobile device cannot identify the nonzero amount of light intensity in the physical environment of the mobile device, determine whether the mobile device is located indoors or outdoors based on being connected to the WiFi network, and independently of a zero amount of light intensity of the physical environment of the mobile device.

20. The non-transitory computer-readable storage medium of claim 15, wherein determining whether the time of day corresponds to day time or night time comprises determining whether the time of day for the mobile device corresponds to day time or night time based on a system clock of the mobile device.

* * * * *